United States Patent
Rubin et al.

(10) Patent No.: US 6,922,693 B1
(45) Date of Patent: Jul. 26, 2005

(54) METHOD AND SYSTEM FOR COPY PROTECTION OF IMAGES DISPLAYED ON A COMPUTER MONITOR

(75) Inventors: Moshe B. Rubin, Jerusalem (IL); Moishe Halibard, Jerusalem (IL)

(73) Assignee: Finjan Software, Ltd., South Netanya (IL)

(*) Notice: Subject to any disclaimer, the term of this patent is extended or adjusted under 35 U.S.C. 154(b) by 687 days.

(21) Appl. No.: 09/636,299

(22) Filed: Aug. 10, 2000

Related U.S. Application Data

(63) Continuation-in-part of application No. 09/459,493, filed on Dec. 13, 1999, which is a continuation-in-part of application No. 09/397,331, filed on Sep. 14, 1999, and a continuation-in-part of application No. 09/313,067, filed on May 17, 1999.

(51) Int. Cl.[7] .............................................. G06F 17/30
(52) U.S. Cl. .................... 707/7; 707/104.1; 713/201
(58) Field of Search ................... 380/30, 51, 279; 713/200, 201, 202, 203, 155, 204; 705/52, 53, 44, 14; 707/9, 104.1; 709/225, 227; 217/122

(56) References Cited

U.S. PATENT DOCUMENTS

| | | | |
|---|---|---|---|
| 4,405,829 A | 9/1983 | Rivest et al. | 380/30 |
| 4,827,508 A | 5/1989 | Shear | 705/53 |
| 4,977,594 A | 12/1990 | Shear | 705/53 |
| 5,050,213 A | 9/1991 | Shear | 705/53 |
| 5,303,370 A | 4/1994 | Brosh et al. | 380/51 |
| 5,410,598 A | 4/1995 | Shear | 705/53 |
| 5,509,070 A | 4/1996 | Schull | 705/54 |
| 5,533,124 A | 7/1996 | Smith et al. | 705/57 |
| 5,636,292 A | 6/1997 | Rhoads | 382/222 |
| 5,638,513 A | 6/1997 | Ananda | 713/202 |
| 5,710,834 A | 1/1998 | Rhoads | 382/256 |

(Continued)

FOREIGN PATENT DOCUMENTS

WO    WO 98/44424    10/1998

OTHER PUBLICATIONS

Chapter 3—Understanding Image Guardian—3 pages.
Chapter 3—Understanding Web Referee—3 pages.
"Copysight", http://www.ip2.com.

(Continued)

Primary Examiner—Charles L. Rones
Assistant Examiner—Hassan Mahmoudi
(74) Attorney, Agent, or Firm—Squire, Sanders & Dempsey, L.L.P.

(57) ABSTRACT

A method for preventing copying a proprietary digital image data that is rendered within a window displayed on a computer monitor, including providing screen pixel data for rendering on a computer monitor, the screen pixel data including pixel data for a first window having proprietary digital image data therewithin, detecting that a second window is going to be displayed on the computer monitor, determining the position and size of the second window, determining, based on the position and size of the second window, a portion of the screen pixel data wherein the first window is going to be covered by the second window, and replacing the portion of the screen pixel data with substitute pixel data, prior to the second window being displayed. A system is also described and claimed.

28 Claims, 11 Drawing Sheets

U.S. PATENT DOCUMENTS

| | | | | |
|---|---|---|---|---|
| 5,715,403 | A | 2/1998 | Stefik | 705/44 |
| 5,721,788 | A | 2/1998 | Powell et al. | 382/100 |
| 5,745,360 | A | 4/1998 | Leone et al. | |
| 5,745,604 | A | 4/1998 | Rhoads | 382/232 |
| 5,748,763 | A | 5/1998 | Rhoads | 382/115 |
| 5,748,783 | A | 5/1998 | Rhoads | 382/232 |
| 5,754,170 | A * | 5/1998 | Ranganathan | 345/558 |
| 5,758,068 | A | 5/1998 | Brandt et al. | 713/200 |
| 5,765,152 | A | 6/1998 | Erickson | 707/9 |
| 5,768,426 | A | 6/1998 | Rhoads | 382/232 |
| 5,781,914 | A | 7/1998 | Stork et al. | |
| 5,790,117 | A * | 8/1998 | Halviatti et al. | 345/744 |
| 5,801,679 | A | 9/1998 | McCain | 345/856 |
| 5,801,689 | A | 9/1998 | Huntsman | |
| 5,805,724 | A * | 9/1998 | Metcalfe et al. | 382/176 |
| 5,809,160 | A | 9/1998 | Powell et al. | 382/100 |
| 5,822,436 | A | 10/1998 | Rhoads | 380/54 |
| 5,832,119 | A | 11/1998 | Rhoads | 382/232 |
| 5,835,722 | A | 11/1998 | Bradshaw et al. | 709/225 |
| 5,838,902 | A | 11/1998 | Shin | 713/200 |
| 5,841,886 | A | 11/1998 | Rhoads | 382/115 |
| 5,841,978 | A | 11/1998 | Rhoads | 709/217 |
| 5,850,481 | A | 12/1998 | Rhoads | 382/232 |
| 5,862,260 | A | 1/1999 | Rhoads | 382/232 |
| 5,870,544 | A | 2/1999 | Curtis | 713/201 |
| 5,872,915 | A | 2/1999 | Dykes et al. | 713/202 |
| 5,881,287 | A * | 3/1999 | Mast | 717/127 |
| 5,892,900 | A | 4/1999 | Ginter et al. | 713/200 |
| 5,905,505 | A | 5/1999 | Lesk | 345/630 |
| 5,920,848 | A | 7/1999 | Schutzer et al. | 705/42 |
| 5,968,119 | A | 10/1999 | Stedman et al. | |
| 5,974,441 | A | 10/1999 | Rogers et al. | 709/200 |
| 5,982,931 | A | 11/1999 | Ishimaru | 382/218 |
| 5,991,399 | A | 11/1999 | Graunke et al. | 380/279 |
| 5,999,941 | A | 12/1999 | Andersen | 707/103 R |
| 6,009,410 | A | 12/1999 | LeMole et al. | 705/14 |
| 6,011,905 | A | 1/2000 | Huttenlocher et al. | 358/1.2 |
| 6,014,702 | A | 1/2000 | King et al. | 709/227 |
| 6,032,150 | A | 2/2000 | Nguyen | 707/102 |
| 6,205,480 | B1 | 3/2001 | Broadhurst et al. | 709/225 |
| 6,236,387 | B1 | 5/2001 | Imada | |
| 6,240,450 | B1 | 5/2001 | Sharples et al. | 709/224 |
| 6,260,141 | B1 | 7/2001 | Park | 713/155 |
| 6,289,137 | B1 * | 9/2001 | Sugiyama et al. | 382/299 |
| 6,298,422 | B1 * | 10/2001 | Spilo et al. | 711/154 |
| 6,343,274 | B1 | 1/2002 | McCollom et al. | 705/276 |
| 6,343,738 | B1 | 2/2002 | Ogilvie | 235/381 |
| 6,353,892 | B2 * | 3/2002 | Schreiber et al. | 713/201 |
| 6,601,108 | B1 | 7/2003 | Marmor | |

OTHER PUBLICATIONS

"Copysight: Now You Can Protect Your Website Content on the Internet with Copysight's Suite of Software and Business Solutions", (http://www.ip2.com), 1999.

Digimarc & Copyright Protection (http://www.digimarc.com), 1999.

"Digital Rights Management" http://www.intertrust.com.

"SafeImage", http://www.safemedia.com.

"SiteShield"press release, http://www.maximized.com/press/960529–1.html.

"SiteShield" product details, http://www.maximized.com/products/siteshield/why.html.

"Softlock.Com". http://www.softlock.com.

Strom, D., "Browser: Protect Your Image on the Web", 1998 (http://www.zdnet.com).

Mynatt et al. "Nonvisual Presentation of Graphical User Interfaces: Contrasting Two Approaches"; 1994, ACM, pp. 166–172.

* cited by examiner

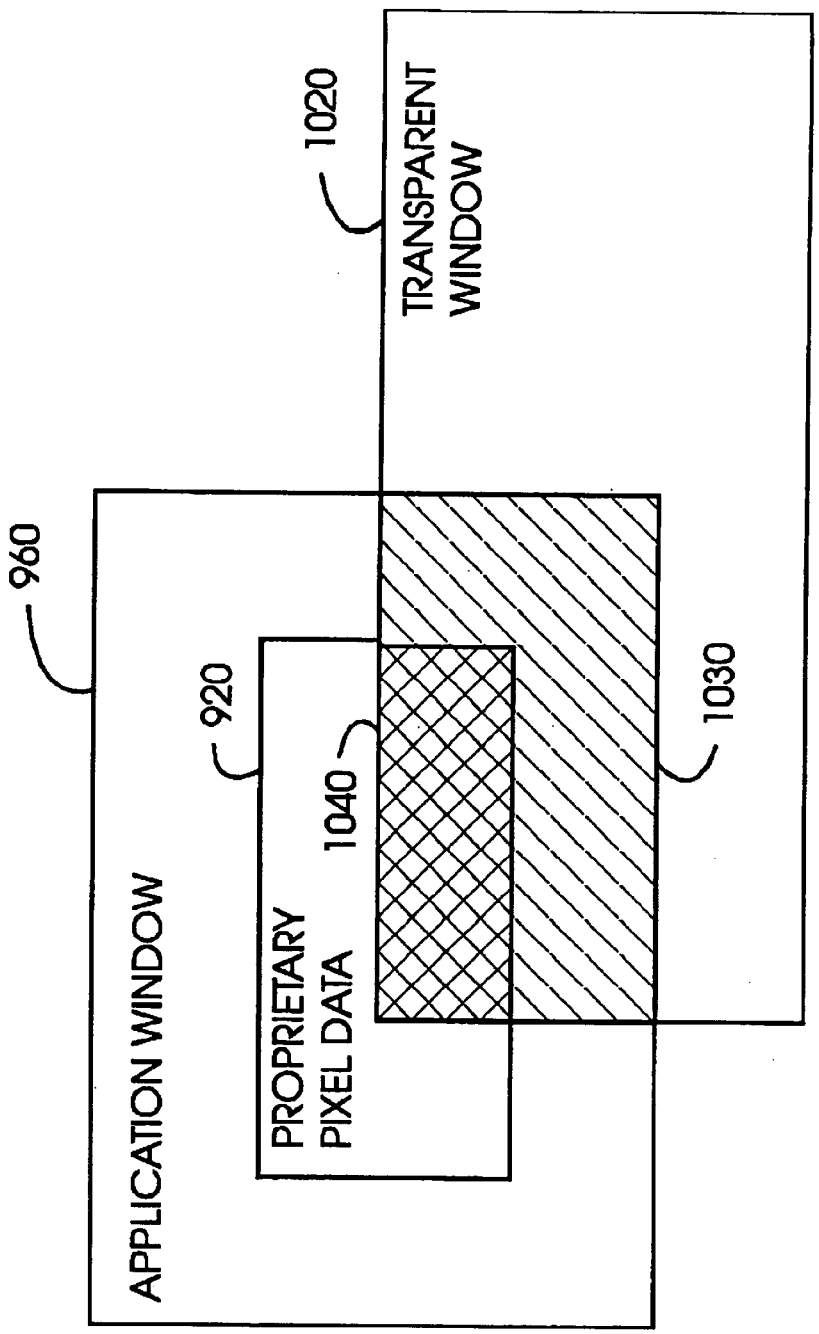

METHOD AND SYSTEM FOR COPY PROTECTION OF IMAGES DISPLAYED ON A COMPUTER MONITOR

CROSS-REFERENCE TO RELATED APPLICATION

This application is a continuation-in-part of assignee's application U.S. Ser. No. 09/459,493, filed Dec. 13, 1999, entitled "Method and System for Copyright Protection of Digital Images" which is a continuation-in-part of U.S. Ser. No. 09/397,331 filed Sep. 14, 1999, which is a continuation-in-part of U.S. Ser. No. 09/313,067 filed May 17, 1999.

A Microfiche Appendix which includes one (1) sheet of microfiche with thirty (30) frames is incorporated herein by reference.

FIELD OF THE INVENTION

The present invention relates to copy protection of digital data, and more specifically to copy protection of proprietary digital images displayed on a computer monitor.

BACKGROUND OF THE INVENTION

Software copy protection is a central concern in software development, and in copyright law itself. Typically, software is distributed in shrink-wrap packages containing diskettes and/or CD-ROMs, and by download over the Internet via ftp servers. Protecting software from rampant unauthorized copying, distribution and use ("software piracy") is one of the most challenging problems facing the software industry.

Over the past years, several techniques have been developed for combating software piracy. These include use of hardware plugs, use of license keys, use of tokens and sophisticated encryption systems.

One of the leading technologies for controlling use of software within turnkey transaction systems is the Digital Rights Management system of InterTrust® Technologies Corp. of Sunnyvale, Calif., as described in U.S. Pat. Nos. 5,892,900, 5,410,598, 5,050,213, 4,977,594 and 4,827,508. Information about InterTrust is available on the web at http://www.intertrust.com.

Another leading technology is the CyberSales Solution™ of SoftLock.com, Inc. of Maynard, Mass., as described in U.S. Pat. No. 5,509,070. CyberSales Solution provides locking and unlocking functionality so that content can be securely previewed by consumers, electronically purchased and redistributed, and it protects the content in an initial transaction and in subsequent information pass-along. Content providers can control how much information is available without paying, and disable, or additionally charge for, the ability to print or cut and paste. CyberSales Solution handles secure transactions, remittance processing, reports, audits and customer service. Information about CyberSales Solution is available on the web at http://www.softlock.com.

With the advent of the use of compelling multi-media on web pages accessible over the Internet, protection of digital images and other media is becoming increasingly critical. Web designers are reluctant to use valuable digital "works of art" knowing that users can easily copy them onto their own computers, and use them for their own unauthorized purposes. Moreover, anyone using a web browser to view an image posted on the Internet can easily copy the image by simply positioning a mouse pointer over the displayed image, clicking on the right mouse button and selecting a "Save Image As . . . " command. Copyright and piracy issues are of major concern to web publishers.

Prior art techniques for protecting digital images include the embedding of invisible digital watermarks within images, so that copies of protected images can be identified and traced. Digimarc Corporation of Lake Oswego, Oreg. embeds hidden messages within pixel data for identifying protected images, and tracks their distribution over the Internet to monitor potential copyright infringement. Digimarc images carry unique IDs that link to pre-determined locations on the web. Digimarc images are compatible with standard image formats, such as JPEG, and can be opened and displayed by standard image readers. However, when opened with a Digimarc reader, the images are displayed together with a "Web look up" button that enables a user to identify the sources of the images. Digimarc technology is described in U.S. Pat. Nos. 5,862,260, 5,850,481, 5,841,978, 5,841,886, 5,832,119, 5,822,436, 5,809,160, 5,768,426, 5,765,152, 5,748,783, 5,748,763, 5,745,604, 5,721,788, 5,710,834 and 5,636,292. Information about Digimarc is available on the web at http://www.digimarc.com.

These techniques are useful in thwarting digital image piracy to the extent that they trace pirated content, but they do not prevent unauthorized copying of digital images in the first place.

Other prior art techniques require a webmaster to modify images residing on a server computer in order to protect them. The webmaster is also required to modify his web pages accordingly, so as to reference the modified images. SafeMedia™ is a software product of Internet Expression, Inc. of Exton, Pa. that converts images from a standard format such as JPEG into a SIF (Safe Image Format). SIF images can only be viewed with a SafeMedia Java viewer. SafeMedia embeds a host or domain name into an image, and checks that the image is located on the web site it was intended for. SafeMedia also includes enhanced system control for preventing screen capture by disabling a clipboard. Information about SafeMedia is available on the web at http://www.safemedia.com.

These prior art techniques are difficult to embrace, since they require modification of all protected images on the web, as well as modification of the web pages that reference them. Furthermore the SIF Java viewer has the limitation of only being able to load images from the same server that the viewer came from.

Other prior art techniques for protecting digital images use Java applets within web browsers to disable the menu that pops up when a user right clicks on a displayed image within his web browser. Copysight® is a software application of Intellecutal Protocols, LLC of Nanuet, N.Y. that uses digital watermarking and fingerprinting to protect images, and includes a Java applet that disables the command to save displayed images within a web browser and the command to print them. Copysight operates by converting unprotected files to protected files that are encrypted and that contain digital fingerprints. Copysight also tracks distribution of protected images across the Internet, and issues reports of potential copyright infringement. Information about Copysight is available on the web at http://www.ip2.com.

Typically, when a digital image is displayed on a computer monitor, the pixel data is temporarily stored within a video RAM, the contents of which are then rendered on the monitor. Prior art techniques disable unauthorized copying of digital images from within web browsers, but they do not protect the images from being copied directly from a video RAM. For example, they do not prevent a user from copying digital images displayed in his web browser by means of a Print Screen or other such command that serves to capture contents of a video RAM to a clipboard. Thus a Java applet that prevents unauthorized copying of digital images from within Netscape Communicator of Internet Explorer can be circumvented by a user pressing on a Print Screen button of his keyboard, or by a user copying and pasting from a window of his web browser to a window of another software application.

Another way for a user to copy data from a video RAM within the Microsoft Windows® operating system is by use of a "transparent window" which does not erase its background. A transparent window is one that does not have its own background painted on it. Such a window, when opened on a screen, shows the contents of the screen transparently within it. That is, only its window frame appears on the screen, and the contents of the display appear through the window area within the frame. Although such a transparent window appears genuinely transparent, in fact the contents of the screen are copied and used as the background for the window. This is apparent when a user moves such a transparent window to a new location on the screen. When the window is moved, the previous portion of the screen appears in the window's new location.

Thus it can be appreciated that a user can copy an image displayed on a computer monitor by simply opening a transparent window and positioning it so that its frame encompasses the desired image. The contents of the display screen within the frame are copied into the background of the window, making it possible for a user to then capture the contents, including the desired image.

Specifically, reference is made to FIG. 1, which is a prior art illustration of a proprietary digital image 100. Typically, when image 100 is posted on a web page, such as HTML page 150 (FIG. 2) residing on a server computer, and displayed by a web browser running on a client computer, a user can copy image 100 to his local computer.

Applicant's four co-pending applications
(i) U.S. Ser. No. 09/313,067, filed on May 17, 1999 and entitled METHODS AND APPARATUS FOR PREVENTING REUSE OF TEXT, IMAGES AND SOFTWARE TRANSMITTED VIA NETWORKS;
(ii) U.S. Ser. No. 09/397,331, filed Sep. 14, 1999 and entitled METHOD AND SYSTEM FOR COPYRIGHT PROTECTION OF DIGITAL IMAGES TRANSMITTED OVER NETWORKS;
(iii) U.S. Ser. No. 09/459,493, filed on Dec. 13, 1999 and entitled METHOD AND SYSTEM FOR COPYRIGHT PROTECTION OF DIGITAL IMAGES TRANSMITTED OVER NETWORKS; and
(iv) U.S. Ser. No. 09/493,023, filed on Jan. 27, 2000 and entitled METHOD AND SYSTEM FOR CONTENT COMMERCIALIZATION
concern technology for preventing unauthorized copying of images.

Reference is now made to FIG. 2, which is an illustration of the results of a screen capture when proprietary digital image 100 is being displayed on the screen, and when copy protection technology from the above referenced patent applications is deployed. When a screen capture application tries to copy pixel data of proprietary digital image 100, watermarked image data is substituted for proprietary digital image 100. Using the technology described in the above-referenced patent applications, a web administrator can ensure that when a user tries to copy image 100 from within web page 150, another image, such as watermarked image 200, is substituted for image 100 prior to capture of image pixel data. Thus, although image 100 is displayed on a computer screen, a screen capture program will only be able to capture pixels of image 200.

Reference is now made to FIG. 3, which is a prior art illustration of a transparent window 300 with a non-erase background. Although a typical Windows application immediately erases its main window, this is not necessary, and it is possible to write an application that does not erase its background. At first glance, window 300 appears to be transparent, with no background. However, this is not the case.

Reference is now made to FIG. 4, which is a prior art illustration of transparent window 300 when it is moved to another location, revealing that it had copied a part of the screen display into its background when it was opened in its previous position. Indeed, as can be seen in FIG. 4, window 300 is not really transparent, but rather has a background that coincides with the pixel data from the position where it was originally opened.

Reference is now made to FIGS. 5A–5D, which illustrate steps for creating an application having a window with a non-erase background, such as transparent window 300 (FIG. 3), using a Microsoft Visual C++ compiler wizard. FIGS. 5A–5D are representative images of user interface screens from Microsoft Visual C++ version 6. The first step is to create a new Microsoft Foundation Class (MFC) AppWizard (exe) project, as illustrated by element 510 in window 520 entitled "New" in FIG. 5A, used for creating new projects. After selecting such an MFC project, the user clicks "OK", then successively clicks on "Next>" and finally on "Finish", through to the end of the program. The next step is to add a new WM_ERASEBKGND Windows message handler to the View, as illustrated by element 530 in window 540 entitled "New Windows Message and Event Handlers for class CNoeraseView" in FIG. 5B. After adding such a message handler to the View, the user clicks on "Add". The next step is to click on "Edit", in order to modify the message handler code. Specifically, the user changes message handler code from that illustrated in FIG. 5C to that illustrated in FIG. 5D. The last step is to compile the application. When the application is run, it will generate a transparent window such as transparent window 300.

The complete software listing for the application generated by the above steps is provided in Appendix A.

Such a transparent window as transparent window 300 can be used to capture proprietary image data from a computer screen. Reference is now made to FIG. 6, which is a prior art illustration of use of a transparent window to copy proprietary digital image 100 from a web page 150. Transparent window 600 is sized and positioned so that it includes proprietary digital image 100 within its frame when it is opened. Window 600 appears to be transparent, and digital image 100 shows through its frame. However, the pixel data that shows through window 600 is actually copied into its background.

Reference is now made to FIG. 7, which is a prior art illustration of a screen capture of a screen in which transparent window 600 has been moved to another location, when copy protection technology from the above referenced patent applications is deployed. As can be seen from FIG. 7, window 600 has copied proprietary digital image 100 into its background. As can be further seen from FIG. 7, the proprietary digital image was recognized as being within web page 150 and watermarked data was substituted therefor. However, it was not recognized as being within transparent window 600, and watermarked data was not substituted therefor. The screen capture succeeded in capturing proprietary image 100 within transparent window 600.

Reference is now made to FIG. 8, which is a prior art illustration of a software paint program 800 that has copied the clipboard from FIG. 7 into its own window, thereby capturing proprietary digital image 100. At this stage, the user has unrestricted access to proprietary digital image 100.

Thus it can be seen that use of a transparent window with a non-erase background works around security software that normally protects proprietary image data that is displayed from being captured, and, as such, it poses a threat to copy protection of image data over the Internet.

SUMMARY OF THE INVENTION

The present invention provides a method and system for preventing unauthorized copying of proprietary digital image data.

There is thus provided in accordance with a preferred embodiment of the present invention a method for preventing copying of proprietary digital image data that is rendered within a window displayed on a computer monitor, including providing screen pixel data for rendering on a computer monitor, the screen pixel data including pixel data for a first window having proprietary digital image data therewithin, detecting that a second window is going to be displayed on the computer monitor, determining the position and size of the second window, determining, based on the position and size of the second window, a portion of the screen pixel data wherein the first window is going to be covered by the second window, and replacing the portion of the screen pixel data with substitute pixel data, prior to the second window being displayed.

There is further provided in accordance with a preferred embodiment of the present invention a system for preventing copying of proprietary digital image data that is rendered within a window displayed on a computer monitor, including a computer monitor on which the screen pixel data is rendered, the screen pixel data including pixel data for a first window having proprietary digital image data therewithin, an event detector detecting that a second window is going to be displayed on the computer monitor, a window processor for determining the position and size of the second window, and for determining, based on the position and size of the second window, a portion of the screen pixel data wherein the first window is going to be covered by the second window, and a pixel processor for replacing the portion of the screen pixel data with substitute pixel data, prior to the second window being displayed.

There is yet further provided in accordance with a preferred embodiment of the present invention a method for preventing copying of proprietary digital image data that is rendered within a window displayed on a computer monitor, including providing screen pixel data for rendering on a computer monitor, the screen pixel data including pixel data for a first window having proprietary digital image data therewithin, detecting that a second window is going to be displayed on the computer monitor, determining the position and size of the second window, determining, based on the position and size of the second window, a portion of the screen pixel data wherein the proprietary digital image data is going to be covered by the second window, and replacing the portion of the screen pixel data with substitute pixel data, prior to the second window being displayed.

There is additionally provided in accordance with a preferred embodiment of the present invention a system for preventing copying of proprietary digital image data that is rendered within a window displayed on a computer monitor, including a computer monitor on which screen pixel data is rendered, the screen pixel data including pixel data for a first window having proprietary digital image data therewithin, an event detector detecting that a second window is going to be displayed on the computer monitor, a window processor for determining the position and size of the second window, and for determining, based on the position and size of the second window, a portion of the screen pixel data wherein the proprietary digital image data is going to be covered by the second window, and a pixel processor for replacing the portion of the screen pixel data with substitute pixel data, prior to the second window being displayed.

BRIEF DESCRIPTION OF THE DRAWINGS

The present invention will be more fully understood and appreciated from the following detailed description, taken in conjunction with the drawings in which:

FIG. 10 is an illustration of the appearance of a window with a non-erase background encompassing a portion of a proprietary digital image.

LIST OF APPENDICES

Appendix A is a software listing of prior art functions for creating an application having a window with a non-erase background, using a Microsoft Visual C++ compiler.

DETAILED DESCRIPTION OF A PREFERRED EMBODIMENT

The present invention provides a method and system for preventing unauthorized copying of proprietary digital image data. Specifically, the present invention enables blocking use of windows with non-erase backgrounds for copying proprietary image data that is rendered on a computer monitor display screen.

As described hereinabove with reference to FIGS. 1–8, a window with a non-erase background can be used in order to circumvent prior art copy protection systems, by capturing proprietary digital image data within a transparent area of such a window. Although prior art copy protection systems can protect against various methods of screen capture of pixel data rendered on a display screen, such as screen capture by use of a PrintScreen command, or screen capture by copying screen data into a clipboard, the prior art systems do not protect against screen capture through use of a window with a non-erase background. The present invention overcomes this limitation.

Figure 9:
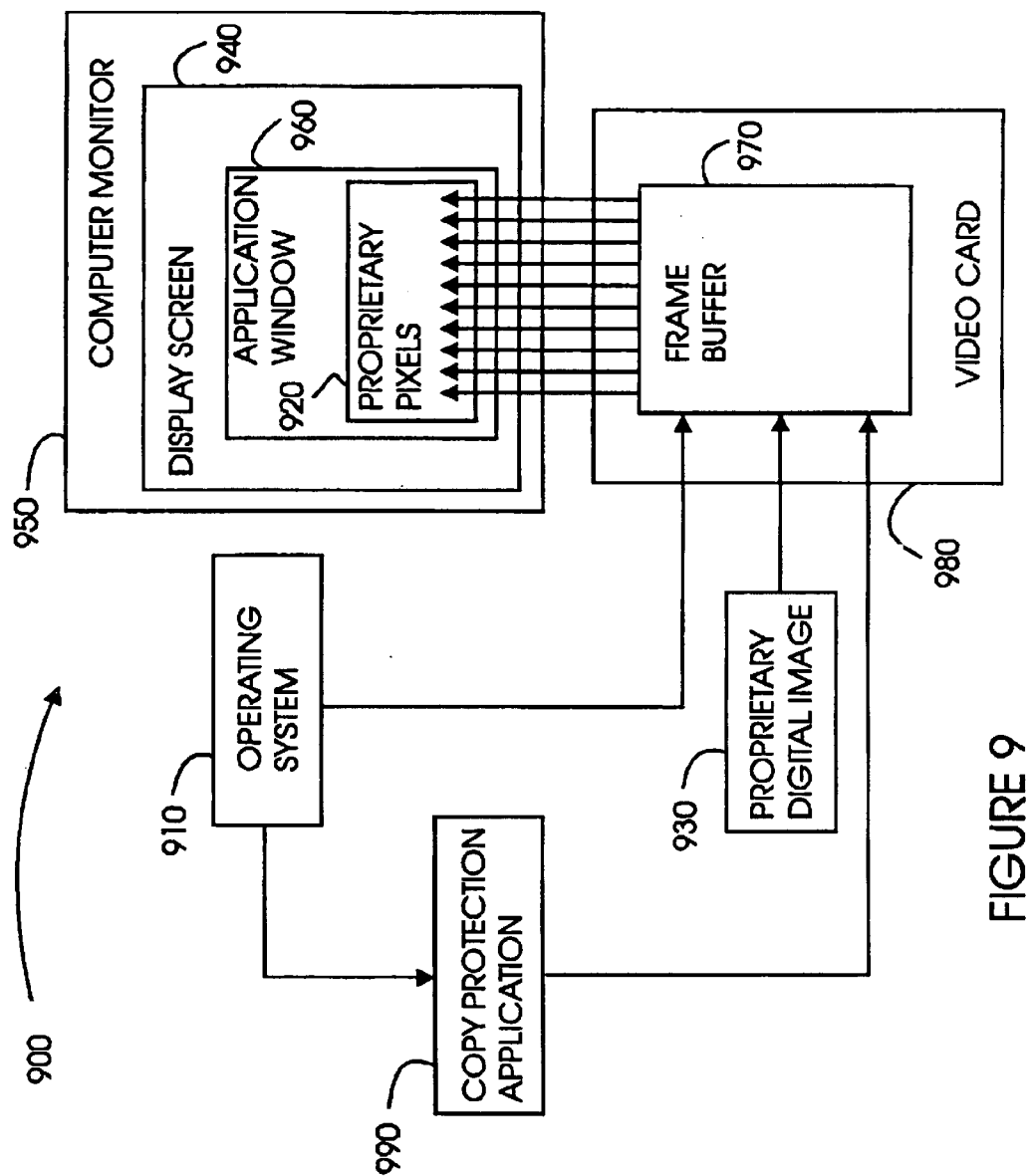
FIG. 9 is a simplified illustration of a computer system for implementing a preferred embodiment of the present invention.

Reference is now made to FIG. 9, which is a simplified illustration of a computer system 900 for implementing a preferred embodiment of the present invention. As shown in FIG. 9, computer system 900 includes an operating system 910, such as the Microsoft Windows operating system, which manages a plurality of software applications running on computer system 900. Proprietary pixels 920 from proprietary digital image 930 are rendered on a display screen 940 of a computer monitor 950, within an application window 960 such as a window of a web browser. Typically, pixel data rendered on display screen 940 is stored in a frame buffer 970 of a video card 980, and video card 980 rapidly generates pixel data for display screen 940 from the data in frame buffer 970. Typically the pixel data in frame buffer 970 is refreshed at rates of 30 frames per second or higher, and video card 970 accordingly refreshes display screen 940 at such rates. To protect proprietary image data, computer system 900 runs a copy protection application 990.

Figure 6:
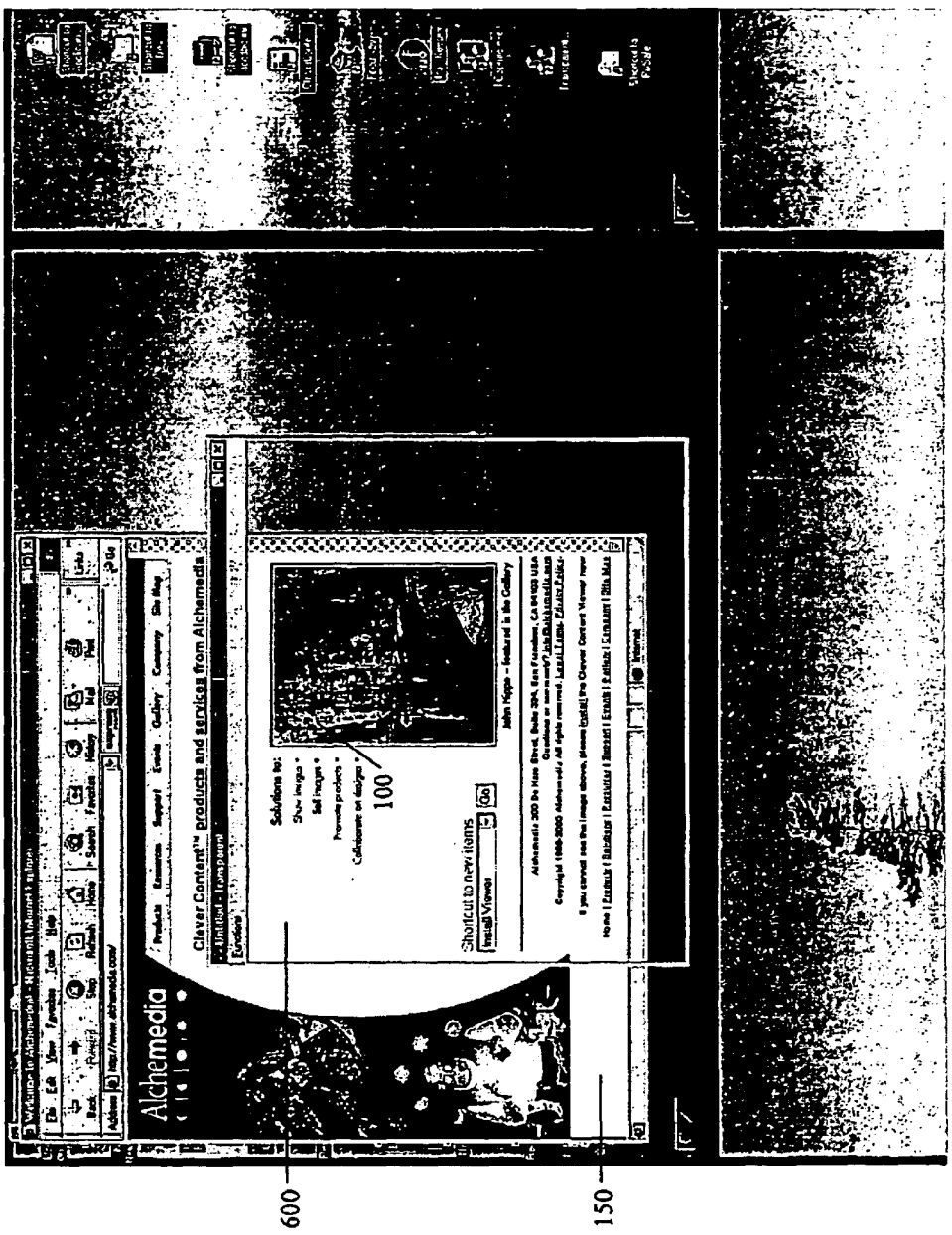
FIG. 6 is a prior art illustration of use of a transparent window to copy the proprietary digital image of FIG. 1 from a web browser.
Figure 7:
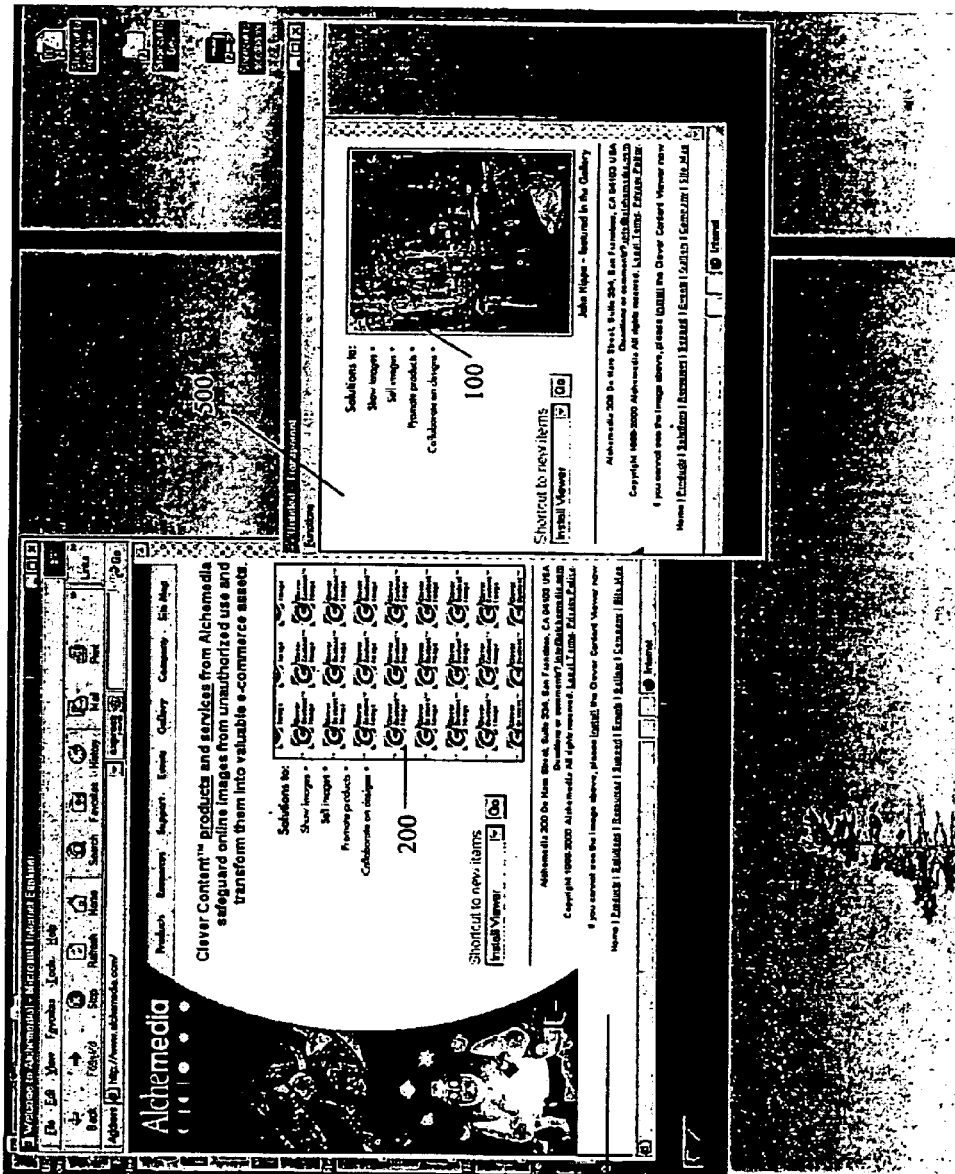
FIG. 7 is a prior art illustration of a screen capture of a screen in which the transparent window of FIG. 6 has been moved to another location.
Figure 8:
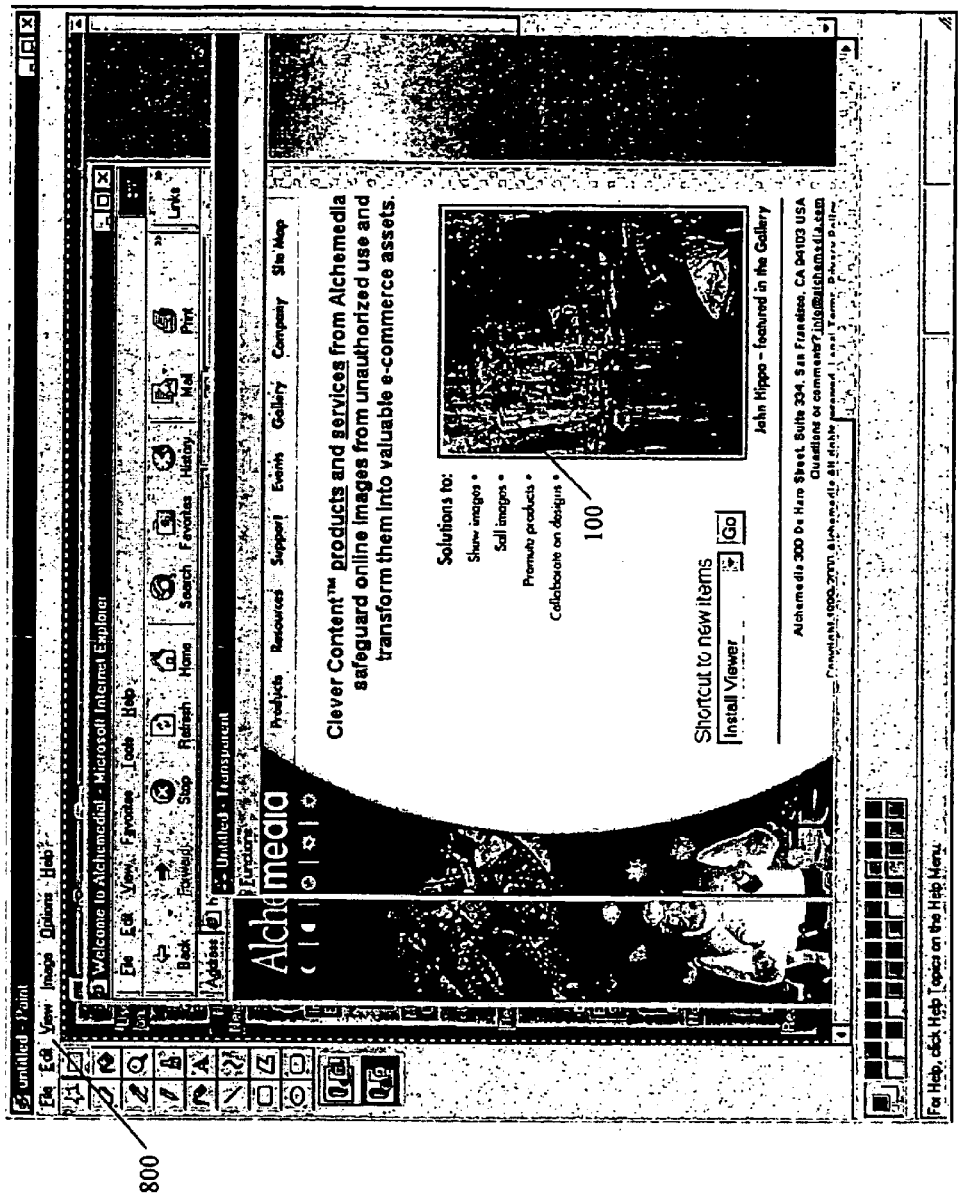
FIG. 8 is a prior art illustration of a software paint program that has copied the clipboard from FIG. 7 into its own window, thereby capturing the proprietary digital image of FIG. 1.

Reference is now made to FIG. 10, which illustrates the appearance of a window 1020 with a non-erase background encompassing a portion of proprietary pixels 920 on display screen 940, such as window 600 that encompasses proprietary digital image 100 (FIG. 6). Window 1020 can appear, for example, as a window of a newly running application program, or as a window of a running application that was previously not visible on display screen or previously positioned elsewhere. Window 1020 can appear in response to a user's launching of a software application, or resizing of a window, or maximizing of a window that was previously minimized, or brining a window that was previously obscured behind window 960 in front of window 960.

In a preferred embodiment of the present invention, a software application, such as copy protection application 990, can use Windows system-wide hooks to detect the appearance of window 1020 prior to its being rendered on display screen 940. Hooks are well known to those skilled in the art as a way to get information about operating system events. Specifically, with reference to the Windows operating system, copy protection application 990 preferably registers to have a Windows computer-based training (CBT) system-wide hook and a CallWndProc system-wide hook, which ensures that whenever operating system 910 receives a request for a new CBT event or a new WndProc event, copy protection application 990 is first notified prior to such event's occurrence. CBT events and WndProc events include opening of new windows, and appearances of windows on display screen 940. When operating system 910 receives a request to open window 1020, copy protection application 990 is first notified of such request, and intervenes prior to such request being effectuated by the system. With reference to FIG. 10, copy protection application 990 is notified about window 1020 prior to window 1020 being opened in display screen 940.

In a preferred embodiment of the present invention, when copy protection application 990 receives notice of an event indicating that operating system 910 has been instructed to open window 1020, it determines an area of overlap between application window 960 and window 1020, based on the size and location of window 1020; namely, the hatched area of overlap 1030. Copy protection application 990 then replaces the pixel data in area of overlap 1030 with substitute pixel data, such as all white pixels, prior to the opening of window 1020. As such, when window 1020 does open, its background will only absorb the substitute pixel data in overlap area 1030, and not the proprietary pixel data. Thus proprietary pixels 920 remain copy protected.

Figure 2:
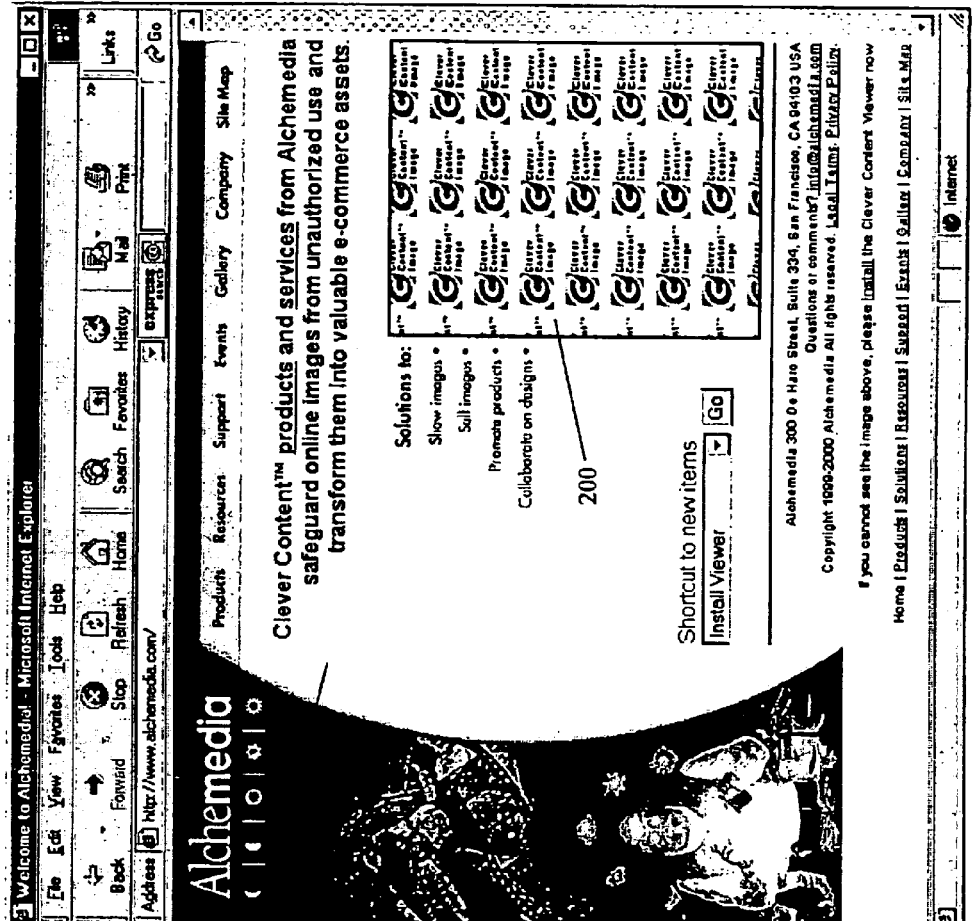
FIG. 2 is a prior art illustration of the results of a screen capture when the proprietary digital image of FIG. 1 is being displayed on the screen.
Figure 1:
FIG. 1 is a prior art illustration of a proprietary digital image.
Figure 3:
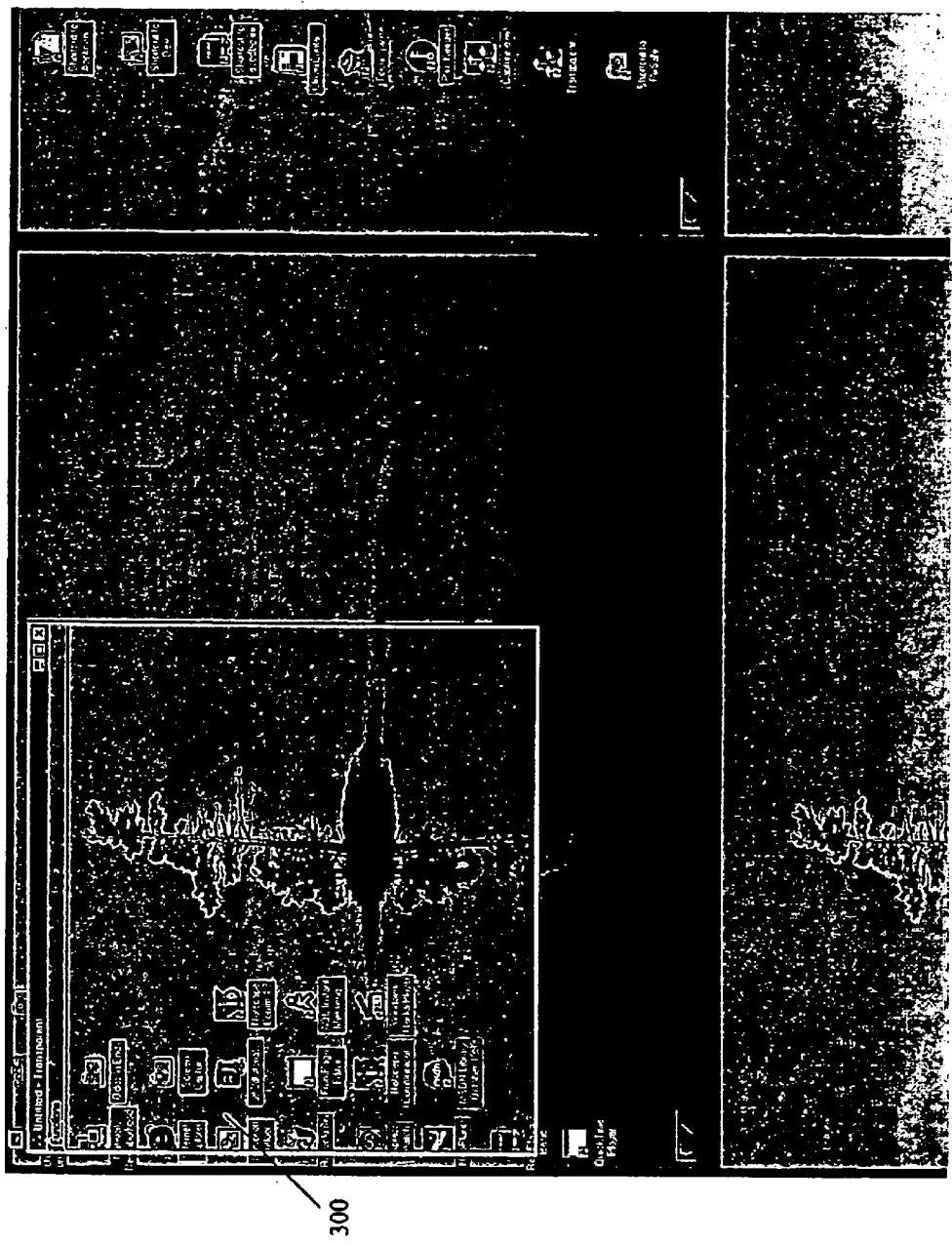
FIG. 3 is a prior art illustration of a transparent window with a non-erase background.
Figure 4:
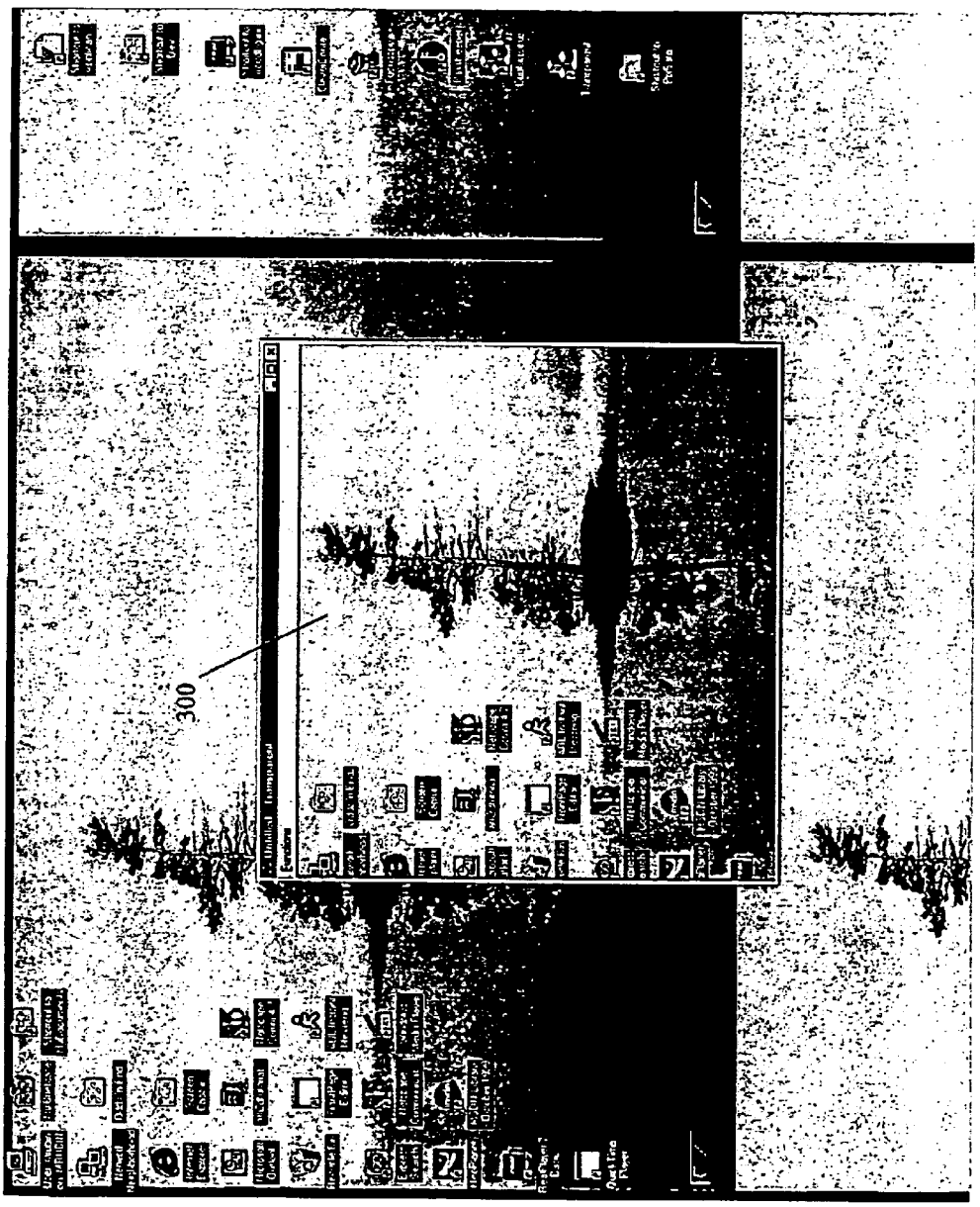
FIG. 4 is a prior art illustration of the transparent window of FIG. 3 when it is moved to another location, showing that it had copied a part of the screen display into its background.
Figure 5A:
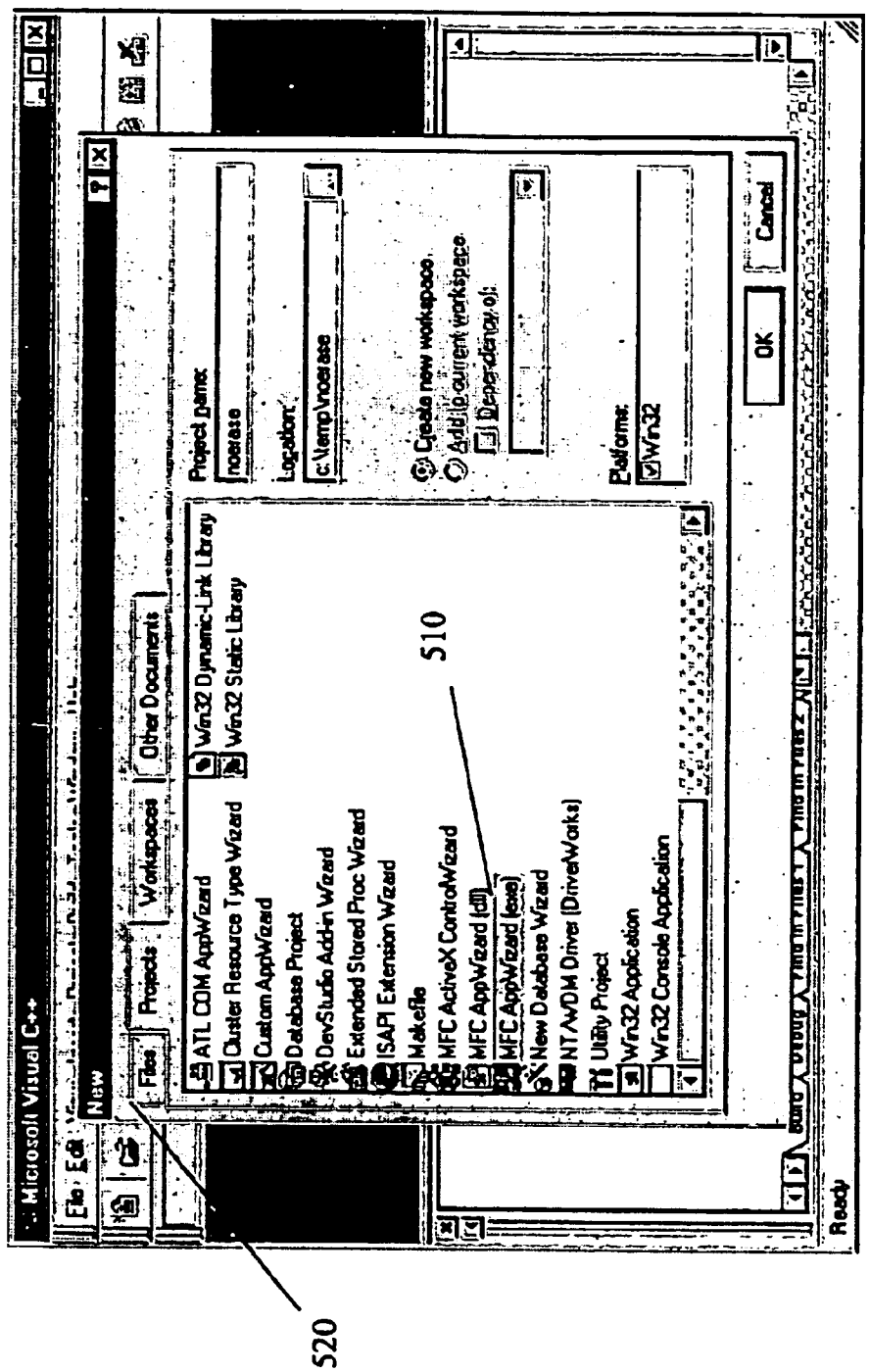
FIGS. 5A–5D are prior art illustrations of steps for creating an application having a window with a non-erase background, using a Microsoft Visual C++ compiler wizard.
Figure 5B:
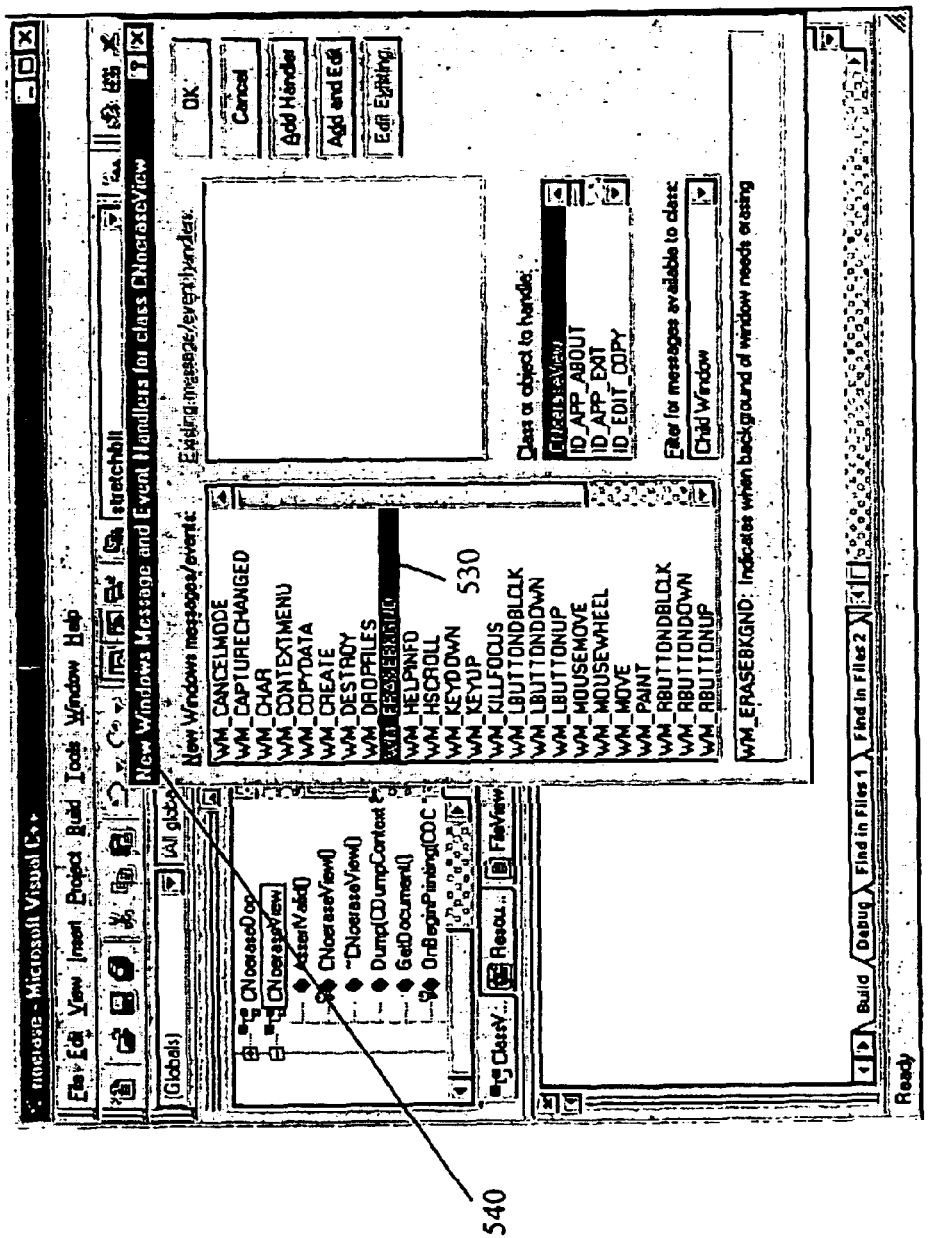
Figure 5C:
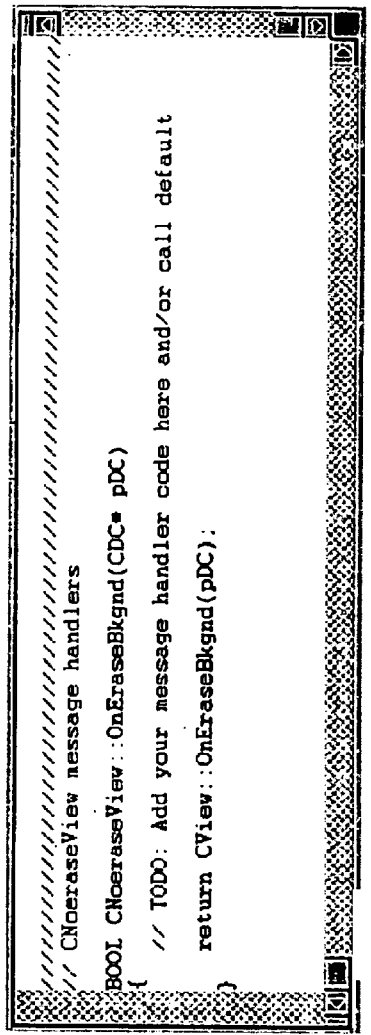
Figure 5D:
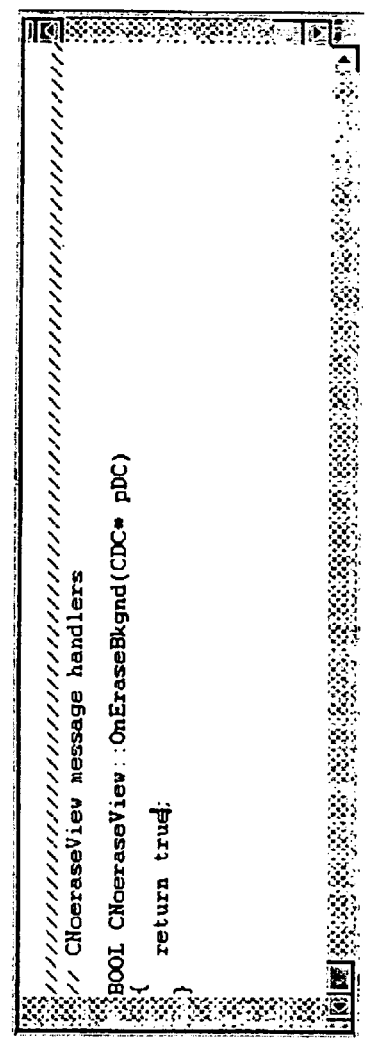

If window 1020 is subsequently moved, its background remains the same, as illustrated in FIG. 4, and thus its background continues to contain substitute pixel data instead of proprietary pixel data. However, there are several cases when window 1020 repaints its background, including:

(i) If window 1020 is minimized and subsequently opened, it repaints its background;
(ii) If window 1020 is enlarged, its background absorbs additional pixel data from the screen;
(iii) If window 1020 is reduced and subsequently enlarged, its background absorbs additional pixel data from the screen; and
(iv) If another application is made active so that its window partially or entirely covers window 1020, and window 1020 is subsequently brought in front of the other application's window, it repaints its background.

For each of these events, copy protection application 990 must be notified prior to the window event occurring, and it must replace pixel data in the appropriate overlap area with substitute pixel data. Otherwise, window 1020 will absorb proprietary pixels 920 into its background.

It is not necessary for copy protection application 990 to replace pixel data with substitute pixel data unless window 1020 overlaps with application window 960. Moreover, it is not necessary to replace pixel data with substitute pixel data in the above cases (ii) and (iii) unless the additional portion of the background area of window 1020 after enlargement overlaps with application window 960. Similarly, it is not necessary to replace pixel data with substitute pixel data in the above case (iv), unless the portion of the background area of window 1020 that was covered by the other application window overlaps with application window 960.

It is appreciated that an alternative embodiment of the present invention is to modify the area of overlap between window 1020 and proprietary pixels 920, namely, the doubly hatched area of overlap 1040, rather than the (larger) area of overlap 1030 between window 1020 and window 950. In this alternative embodiment it is not necessary to replace pixel data with substitute pixel data unless window 1020 overlaps with proprietary pixels 920. Moreover, it is not necessary to replace pixel data with substitute pixel data in the above cases (ii) and (iii) unless the additional portion of the background area of window 1020 after enlargement overlaps with proprietary pixels 920. Similarly, it is not necessary to replace pixel data with substitute pixel data in the above case (iv), unless the portion of the background area of window 1020 that was covered by the other application window overlaps with proprietary pixels 920.

What is claimed is:

1. A method for preventing copying of proprietary digital image data that is displayed on a computer monitor, comprising:

providing screen pixel data to a graphics display frame buffer for rendering on a computer monitor, the screen pixel data including pixel data for a proprietary digital image;

detecting an event that a window is going to be displayed on the computer monitor;

determining the position and size of the window;

determining, based on the position and size of the window, a portion of the screen pixel data that is going to be covered by the background of the window;

modifying the graphics display frame buffer's screen pixel data be replacing at least the portion of the screen pixel data that is going to be covered by the background of the window with substitute pixel data, prior to the window being displayed over the screen pixel data;

displaying the modified screen pixel data; and displaying the window over at least a portion of the substitute pixel data, thereby preventing the window from absorbing unmodified screen pixel data into its background, in case the window is defined so as to have a transparent background.

2. The method of claim 1 further comprising registering an application to include a system-wide hook in order to monitor window events occurring within a windows operating system, and wherein said detecting comprises receiving notification of a window event from the windows operating system.

3. The method of claim 2 wherein the system-wide hook is a windows CBT hook.

4. The method of claim 2 wherein the system-wide hook is a windows CallWndProc hook.

5. The method of claim 1 wherein said detecting detects that a new window is going to be opened.

6. The method of claim 1 wherein said detecting detects that an existing window is going to be enlarged.

7. The method of claim 1 wherein said detecting detects that an existing window is going to be maximized.

8. The method of claim 1 wherein said detecting detects that an existing window is going to be moved from behind another window to in front of the other window.

9. The method of claim 1 wherein the substitute pixel data is white pixel data.

10. The method of claim 1 wherein the portion of the screen pixel data includes all pixel data that is going to be covered by the window.

11. The method of claim 1 wherein the portion of the screen pixel data includes fewer than all pixel data that is going to be covered by the window.

12. A method for preventing copying of proprietary digital image data that is displayed on a computer monitor, comprising:

providing screen pixel data to a graphics display frame buffer for rendering on a computer monitor, the screen pixel data including pixel data for a proprietary digital image;

detecting that a window is going to be displayed on the computer monitor;

determining the position and size of the window;

determining, based on the position and size of the window, a portion of the screen pixel data wherein the proprietary digital image is going to be covered by the background of the window;

modifying the graphics display frame buffer's screen pixel data be replacing at least the portion of the screen pixel data wherein the proprietary digital image is going to be covered by the background of the window with substitute pixel data, prior to the window being displayed over the screen pixel data;

displaying the modified screen pixel data; and displaying the window over at least a portion of the substitute pixel data, thereby preventing the window from absorbing the proprietary digital image into its background, in case the window is defined so as to have a transparent background.

13. The method of claim 12 wherein the portion of the screen pixel data includes all proprietary digital image pixel data that is going to be covered by the window.

14. The method of claim 12 wherein the portion of the screen pixel data includes fewer than all proprietary digital image pixel data that is going to be covered by the window.

15. A system for preventing copying of proprietary digital image data that is displayed on a computer monitor, comprising:

a graphics display frame buffer for storing screen pixel data to be displayed on a computer monitor, the screen pixel data including pixel data for a proprietary digital image;

an event detector detecting that a window is going to be displayed on the computer monitor;

a window processor for determining the position and size of the window, and for determining, based on the position and size of the window, a portion of the screen pixel data that is going to be covered by the background of the window;

a pixel processor for modifying the graphics display frame buffer's screen pixel data by replacing at least the portion of the screen pixel data that is going to be covered by the background of the window with substitute pixel data, prior to the window being displayed over the screen pixel data; and a display processor for displaying the screen pixel data and the modified screen pixel data, and for displaying the window over at least a portion of the substitute pixel data, thereby preventing the window from absorbing unmodified screen pixel data into its background, in case the window is defined so as to have a transparent background.

16. The system of claim 15 further comprising a hook registry for registering an application to include a system-wide hook in order to monitor window events occurring within a windows operating system, and wherein said event detector comprises a notification receiver for receiving notification of a window event from the windows operating system.

17. The system of claim 16 wherein the system-wide hook is a Windows CBT hook.

18. The system of claim 16 wherein the system-wide hook is a Windows CallWndProc hook.

19. The system of claim 15 wherein said event detector detects that a new window is going to be opened.

20. The system of claim 15 wherein said event detector detects that an existing window is going to be enlarged.

21. The system of claim 15 wherein said event detector detects that an existing window is going to be maximized.

22. The system of claim 15 wherein said event detector detects that an existing window is going to be moved from behind another window to in front of the other window.

23. The system of claim 15 wherein the substitute pixel data is white pixel data.

24. The system of claim 15 wherein the portion of the screen pixel data includes all pixel data that is going to be covered by the window.

25. The system of claim 15 wherein the portion of the screen pixel data includes fewer than all pixel data that is going to be covered by the window.

26. A system for preventing copying of proprietary digital image data that is displayed on a computer monitor, comprising:

a graphics display frame buffer for storing screen pixel data to be displayed on a computer monitor, the screen pixel data including pixel data for a proprietary digital image;

an event detector detecting that a window is going to be displayed on the computer monitor;

a window processor for determining the position and size of the window, and for determining, based on the position and size of the second window, a portion of the screen pixel data wherein the proprietary digital image is going to be covered by the background of the window; and a pixel processor for modifying the graphics display frame buffer's screen pixel data by replacing at least the portion of the screen pixel data wherein the proprietary digital image is going to be covered by the background of the window with substitute pixel data, prior to the window being displayed over the screen pixel data; and a display processor for displaying the screen pixel data and the modified screen pixel data, and for displaying the window over at least a portion of the substitute pixel data, thereby preventing the window from absorbing the proprietary digital image into its background, in case the window is defined so as to have a transparent background.

27. The system of claim 26 wherein the portion of the screen pixel data includes all proprietary digital image pixel data that is going to be covered by the window.

28. The system of claim 26 wherein the portion of the screen pixel data includes fewer than all proprietary digital image pixel data that is going to be covered by the window.

* * * * *

UNITED STATES PATENT AND TRADEMARK OFFICE
CERTIFICATE OF CORRECTION

PATENT NO.       : 6,922,693 B1  
APPLICATION NO.  : 09/636299  
DATED            : July 26, 2005  
INVENTOR(S)      : Moshe B. Rubin and Moishe Halibard Page 1 of 1

It is certified that error appears in the above-identified patent and that said Letters Patent is hereby corrected as shown below:

On cover page

Please add -

Foreign Application Priority Data item (30)

Nov. 16, 1998   (IL) ........................................ 127093  
Dec. 30, 1998   (IL) ........................................ 127869  
Jun. 14, 1998   (IL) ........................................ 124895

Signed and Sealed this

Eleventh Day of October, 2011

David J. Kappos  
*Director of the United States Patent and Trademark Office*